United States Patent [19]

Trap

[11] 3,905,792

[45] Sept. 16, 1975

[54] METHOD OF MANUFACTURING SEMI-CONDUCTING GLASSES EXHIBITING ELECTRICAL CONDUCTIVITY IN THE MASS

[75] Inventor: Hendrikus Johan Lodewijk Trap, Emmasingel, Eindhoven, Netherlands

[73] Assignee: U.S. Philips Corporation, New York, N.Y.

[22] Filed: Feb. 15, 1974

[21] Appl. No.: 442,914

[30] Foreign Application Priority Data

Mar. 21, 1973 France .............................. 73.10147

[52] U.S. Cl. .............................. 65/18; 65/31; 65/32; 65/134; 106/52; 106/53; 106/54; 252/518; 252/521

[51] Int. Cl.² .................... C03B 23/20; C03C 15/00

[58] Field of Search .................. 65/18, 31, 32, 134; 106/54, 53, 52; 252/518, 521

[56] References Cited
UNITED STATES PATENTS

| | | | |
|---|---|---|---|
| 2,415,036 | 1/1947 | Quinn .............................. | 65/18 X |
| 3,307,929 | 3/1967 | Trap ...................................... | 65/32 |
| 3,374,185 | 3/1968 | Nitta et al........................... | 252/521 |
| 3,627,550 | 12/1971 | Monneraye........................... | 106/53 |
| 3,753,743 | 8/1973 | Kakuda et al......................... | 106/52 |
| 3,812,688 | 5/1974 | Asher et al. ............................ | 65/18 |
| 3,813,276 | 5/1974 | Trap ....................................... | 65/31 |
| 3,848,625 | 11/1974 | Drake et al..................... | 252/518 X |

*Primary Examiner*—S. Leon Bashore
*Assistant Examiner*—Frank W. Miga
*Attorney, Agent, or Firm*—Frank R. Trifari

[57] ABSTRACT

A method of manufacturing semi-conductor glasses exhibiting conductivity in the mass comprising the steps of obtaining conventional reducible or oxidizable glasses, grinding the glasses to a powder, sieving out from said powder a grain fraction having the required limitations, subjecting the grains to the action of a gas which is preselected depending on whether a reducible or oxidizable oxide is present in the glass during a period and at a temperature which is attuned to the desired conductivity and finally melting the grains.

8 Claims, No Drawings

METHOD OF MANUFACTURING SEMI-CONDUCTING GLASSES EXHIBITING ELECTRICAL CONDUCTIVITY IN THE MASS

The invention relates to a method of manufacturing semi-conducting glasses exhibiting conductivity in the mass, starting from conventional reducible or oxidizable glasses which in turn are obtained from a glass-forming mixture consisting of one or more network-forming oxides on the one hand and of one or more network modifying oxides on the other hand, and to the glasses thus obtained.

It is known to obtain electronically conducting glasses in a conventional manner by using oxides of multivalent metals for which, however, a large number of secondary conditions must be satisfied such as the composition of the glasses and of the glass-forming starting mixture, the nature of the manufacturing atmosphere, the temperature and the temperature programme.

The glasses thus obtained have, however, generally the tendency of phase separation either or not followed by crystallization which limits their possibilities of use to those cases where the product does not require or only requires a light thermal treatment for its design.

In certain cases in which it is sufficient to use an electronically conducting surface layer it is possible to ensure that the design precedes the treatment so that the surface is rendered conducting. Particularly this is usable for the reduction of a lead-containing glass or for the oxidation of a manganese containing glass in which the conductivity is obtained by passing a gas, either hydrogen or oxygen at an elevated temperature over the material.

This is particularly described in United Kingdom Patent Specification 647,414. U.S. Pat. No. 3,420,645 states a method by which solid particles of an aluminosilicate glass are mixed with a given quantity of copper oxide and in which the particles are heated in a hydrogen atmosphere at a temperature of between 600° and 1,000°C for 5 to 120 minutes so that a material is obtained which is coated with a layer of copper oxide. In this manner a coating of metallic copper is obtained while the glass is not stable. In addition there is a risk of dominant metallic conductivity so that the temperature coefficient is of opposite sign. An area will also be formed which is rich in copper ions having a tendency to penetrate the glass in the course of time.

Finally French Patent Specification 1,318,297 describes a method of manufacturing a compact vitreous electrically conducting contact mass. This method consists in that a mixture of molten glass is caused to flow to electrically conducting materials after having coated granulated glass particles in a pretreatment with an enveloping layer of metallic conducting material. According to this method the grains or granules must be coated with a metallic conducting material which has to be added in suitable ratios and likewise as in the above-mentioned United Kingdom Patent Specification an unwanted metallic conductivity is produced. In addition this method cannot be used for borate and silicate glasses because the conducting material is applied in the form of an aqueous solution in which borates and silicates are solable.

The invention is based on the recognition of the fact that it is possible with the use of particles of given dimensions and of suitable glass composition to produce electron conductivity on the surface of these particles having a given limitation of dimensions by using an oxidizing or reducing gas at an optimum temperature and by subsequently proceeding in such a manner that a glass composition is obtained having the desired conductivity in the mass.

The invention relates to a method of manufacturing semi-conducting glasses having conductivity in the mass according to which the conventional reducible or oxidizable glasses are used as a starting material which in turn are obtained from a glass-forming mixture consisting of one or more network-forming oxides on the one hand and of one or more network-modifying oxides on the other hand and is characterized in that the said glasses are ground in a suitable manner to a powder, a grain fraction having the desired limitation being sieved from said powder, said grains being subjected to the action of the gas which gas is chosen dependent on the presence of reducible or oxidizable oxide in the glass for a period and at a temperature which is attuned to the desired conductivity, the grains being finally melted at the required temperature and in a suitable atmosphere. By grain fraction is meant that portion (fraction) of the powder having grain sizes less than a predetermined amount.

The gas which is used for the treatment may be, for example, oxygen, nitrogen oxide or another oxidizing gas or gas mixture when an oxidizing treatment is required; the gas may alternatively be, for example, hydrogen, carbon monoxide or another reducing gas or gas mixture when a reducing treatment is required.

According to a preferred embodiment of the method according to the invention the sieved grains are subjected after the action of the gas to an etching treatment by means of an alkaline solution or a diluted hydrofluoric acid solution.

Preferably the grain size of the powder is chosen to below 150 $\mu$m.

The main advantage of the method according to the present invention is that the method is simple and consists of a series of operations which can be carried out comparatively easily.

Another advantage is that the conductivity is obtained while starting from the material itself and that no extra materials need be added thereto.

A number of examples are given by way of example. They do not in any way limit the use of the invention.

The examples are made starting from glasses of divergent compositions. In addition grains of different sizes have been used and an etching operation has been performed or has not been performed after the oxidation or reduction.

The results of the semi-conducting glasses exhibiting mass conductivity obtained by this method are summarized in the following Tables in which the details of the method and the characteristic properties of the glasses are shown. In these Tables: $\rho$ is the specific resistance in $\Omega$cm of the mass; by means of the equation $$\log \rho = A + \frac{(B}{T)}$$

it is possible to calculate $\phi$, the activation energy in eV, $\phi$ being equal to $0.198B \times 10^{-3}$. T$\rho$ is the temperature in +C in which log $\rho$ = 6.52. A and B are constants.

The embodiments with the non-ground material as a comparison are given in the Tables II and III.

TABLE I

| Composition in mol % of starting glass | | Grain size μm | Nature | Treatment Gas | Treatment Temp. (°C) | Time (h) | Etching treatment Solution | Time (h) | Melting Temp (°C) | Time (h) | Tρ (°C) | φ (eV) | logρ (25%) |
|---|---|---|---|---|---|---|---|---|---|---|---|---|---|
| SiO$_2$ | 58.0 | 150 | reduc. | H$_2$ | 325 | 2 | NaOH (6N) | ¼ | 500 | ½ | 183 | 0.47 | 9.26 |
| PbO | 18.0 | | | | | | | | | | | | |
| B$_2$O$_3$ | 9.0 | 150 | reduc. | H$_2$ | 325 | 2 | — | — | 500 | ½ | 275 | 0.84 | 13.00 |
| As$_2$O$_3$ | 0.2 | | | | | | | | | | | | |
| MgO | 6.0 | <100 | reduc. | H$_2$ | 325 | 2 | NaOH (6N) | ¼ | 500 | ¼ | 85 | 0.38 | 7.18 |
| ZnO | 3.0 | | | | | | | | | | | | |
| Li$_2$O | 3.8 | <100 | reduc. | H$_2$ | 325 | 2 | — | — | 500 | ¼ | 255 | 0.81 | 12.51 |
| Na$_2$O | 2.0 | | | | | | | | | | | | |

TABLE II

| | | Grain size μm | Nature | Gas | Temp. (°C) | Time (h) | Solution | Time (h) | Melting Temp (°C) | Time (h) | Tρ (°C) | φ (eV) | logρ (25%) |
|---|---|---|---|---|---|---|---|---|---|---|---|---|---|
| | | not ground | — | — | — | — | — | — | — | — | 308 | 1.05 | 14.6 |
| SiO$_2$ | 64.1 | 150 | oxid. | O$_2$ | 450 | 2 | NaOH (6N) | ¼ | 500 | ½ | 251 | 0.46 | 10.6 |
| Al$_2$O$_3$ | 4.1 | | | | | | | | | | | | |
| MnO | 18.8 | 150 | oxid. | O$_2$ | 450 | 2 | — | — | 500 | ½ | 270 | 0.62 | 12.4 |
| Li$_2$O | 6.9 | | | | | | | | | | | | |
| Na$_2$O | 5.9 | 50 | oxid. | O$_2$ | 450 | 2 | NaOH (6N) | ¼ | 600 | ½ | 112 | 0.27 | 9.3 |
| As$_2$O$_3$ | 0.2 | | | | | | | | | | | | |
| | | 50 | oxid. | O$_2$ | 450 | 2 | — | — | 600 | ½ | 254 | 9.53 | 11.2 |

TABLE III

| SiO$_2$ | 13.0 | not ground | — | — | — | — | — | — | — | — | 454 | 0.84 | >16 |
|---|---|---|---|---|---|---|---|---|---|---|---|---|---|
| Al$_2$O$_3$ | 4.0 | | | | | | | | | | | | |
| CaO | 38.0 | 150 | reduc. | H$_2$ | 400 | 2 | NaOH (6N) | ¼ | 650 | ½ | 202 | 0.36 | —* |
| Fe$_2$O$_3$ | 9.0 | | | | | | | | | | | | |
| B$_2$O$_3$ | 36.0 | 150 | reduc. | H$_2$ | 400 | 2 | — | — | 650 | ½ | 334 | 0.51 | —* |

(*not determined)

What is claimed is:

1. A method of manufacturing semi-conducting glasses exhibiting conductivity in the mass comprising the steps of:
    providing conventional reducible glasses from a glass forming mixture consisting essentially of at least one network forming oxide and at least one network modifying oxide, said glasses having constituent compounds proportionately selected from the group consisting essentially of SiO$_2$, PbO, B$_2$O$_3$, As$_2$O$_3$, MgO, ZnO, Li$_2$O, Na$_2$O, Al$_2$O$_3$, CaO and Fe$_2$O$_3$;
    grinding said glasses in a preselected manner to a powder;
    sieving out from said powder a grain fraction having a predetermined size limitation;
    subjecting said powder grains to a reducible gas for a predetermined time and temperature; and
    melting the grains after the action of the gas at a predetermined temperature in an atmosphere.

2. The method of claim 1 wherein the reducible gas is hydrogen.

3. A method as claimed in claim 1 also including the step of subjecting the sieved grains to an etching treatment by means of an alkaline solution after the action of the gas.

4. A method as claimed in claim 1 wherein the grain size of the powder is chosen to be less than 150μm.

5. A method of manufacturing semi-conducting glasses exhibiting conductivity in the mass comprising the steps of:
    providing conventional oxidizable glasses from a glass forming mixture consisting essentially of at least one networkforming oxide and at least one network modifying oxide, said glasses having constituent compounds proportionately selected from the group consisting essentially of SiO$_2$, Al$_2$O$_3$, MnO, Li$_2$O, Na$_2$O and As$_2$O$_3$;
    grinding said glasses in a preselected manner to a powder;
    sieving out from said powder a grain fraction having a predetermined size limitation;
    subjecting said powder grains to an oxidizable gas for a predetermined time and temperature; and
    melting the grains after the action of the gas at a predetermined temperature in an atmosphere.

6. The method of claim 5 wherein the oxidizable gas is oxygen.

7. A method as claimed in claim 5 also including the step of subjecting the sieved grains to an etching treatment by means of an alkaline solution after the action of the gas.

8. A method as claimed in claim 5 wherein the graim size of the powder is chosen to be less than 150 μm.

* * * * *

UNITED STATES PATENT AND TRADEMARK OFFICE
CERTIFICATE OF CORRECTION

PATENT NO. : 3,905,792
DATED : September 16, 1975
INVENTOR(S) : HENDRIKUS JOAHN LODEWIJK TRAP It is certified that error appears in the above-identified patent and that said Letters Patent are hereby corrected as shown below:

Column 1, line 55, change "pretreatment" to --pre-treatment--.

Column 2, lines 61-62, change "$\log \rho = A + \frac{(B}{T)}$" to --$\log \rho = A + \frac{B}{T}$-- line 65, change "$I\rho$" to --$T\rho$--.

Claim 1, line 6, change "network forming" to --network-forming--.

Claim 5, line 6, change "networkforming" to --network-forming--.

Signed and Sealed this third Day of February 1976

[SEAL]

Attest:

RUTH C. MASON
*Attesting Officer*

C. MARSHALL DANN
*Commissioner of Patents and Trademarks*